Nov. 24, 1942.  C. L. GROVER  2,303,270
SPINDLE SPEED CONTROL MECHANISM FOR MACHINE TOOLS
Filed Jan. 30, 1942  5 Sheets-Sheet 1

Inventor:-
Charles L. Grover
by his Attorneys
Howson & Howson

Inventor:-
Charles L. Grover
by his Attorneys
Howson & Howson

Inventor:-
Charles L. Grover
by his Attorneys
Howson & Howson

Nov. 24, 1942.   C. L. GROVER   2,303,270
SPINDLE SPEED CONTROL MECHANISM FOR MACHINE TOOLS
Filed Jan. 30, 1942   5 Sheets-Sheet 4

Inventor:-
Charles L. Grover
by his Attorneys
Howson & Howson

Nov. 24, 1942. C. L. GROVER 2,303,270
SPINDLE SPEED CONTROL MECHANISM FOR MACHINE TOOLS
Filed Jan. 30, 1942 5 Sheets-Sheet 5

Inventor:-
Charles L. Grover
by his Attorneys
Howson & Howson

Patented Nov. 24, 1942

2,303,270

UNITED STATES PATENT OFFICE 2,303,270

SPINDLE SPEED CONTROL MECHANISM FOR MACHINE TOOLS

Charles L. Grover, Philadelphia, Pa., assignor to William Sellers & Company, Incorporated, Philadelphia, Pa., a corporation of Pennsylvania Application January 30, 1942, Serial No. 428,942

10 Claims. (Cl. 74—333)

This invention relates to a spindle drive for machine tools and, more particularly, to a drive for the spindles of boring, drilling and milling machines.

In machines of this character it is essential that the spindle be operated at a great number of different cutting speeds, an extensive range being necessary both from the standpoint of enabling the speed of operation to be adapted to the material being handled and to the size of the tool operating upon the material, and to enable the production of a great number of feeding speeds which are usually derived from the rotation of the spindle since they must be coordinated therewith.

In the ordinary construction the gearing is highly complicated, and in one form of the machine with which I am familiar the spindle drive involves the use of no less than thirty-six gears and twelve sliding gears or clutches. Obviously, the use of such a large number of gears and so many clutches is expensive, not only from the standpoint of construction of these elements themselves and their assembly but, likewise, from the standpoint that the clutches and/or sliding gears must, necessarily, be provided with shifting means which is interlocked to prevent inadvertent shifting of the gears in a manner such that breakage would occur.

An important object of this invention is the provision of an extremely simple and effective spindle drive in which the number of gears is reduced to a minimum and the gear contacts occurring during operation are, likewise, materially reduced.

Another object of the invention is to produce a drive of this type which enables a material reduction in the number of driving centers utilized in the transmission.

Figure 1:
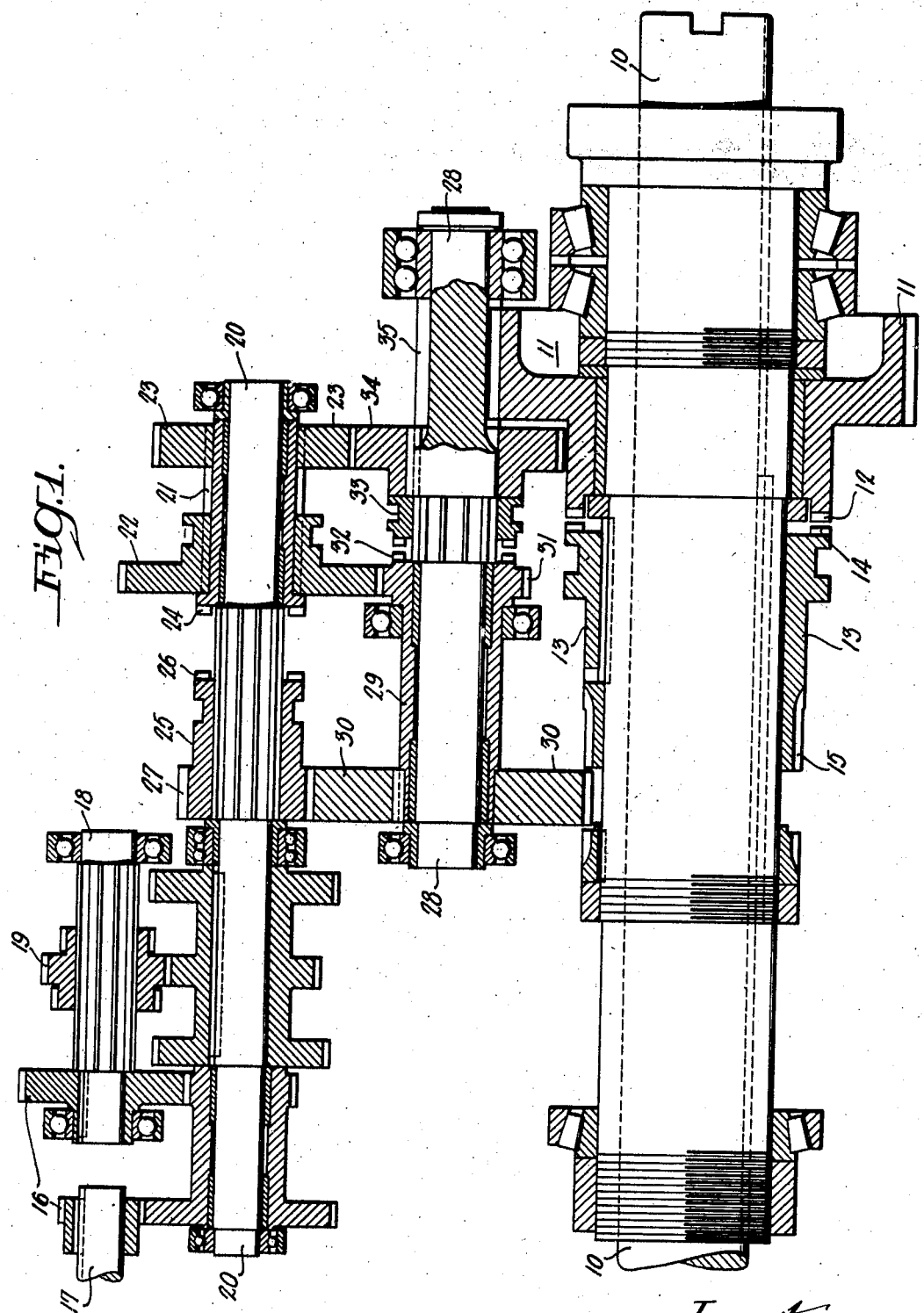

These and other objects I attain by the construction shown in the accompanying drawings wherein, for the purpose of illustration, I have shown a preferred embodiment of my invention and wherein:

Fig. 1 is a diagrammatic section illustrating a spindle drive constructed in accordance with my invention; and Figs. 2 to 8 inclusive are diagrammatic views showing the various speed changes possible with the main transmission.

Referring now more particularly to the drawings, the numeral 10 generally designates the spindle of a machine tool, that at present illustrated being of the type shown in the prior patent to H. R. Young, No. 2,251,863, August 5, 1941, for "Machine tool drive." Upon the spindle a slow speed gear 11 is rotatably mounted, the hub of the gear being formed as one element 12 of a clutch. A collar 13 is splined to the spindle and is formed at one end with the second element 14 of the clutch and at its opposite end is provided with a high speed gear 15. The spindle drive may be generally divided into three sections, the first section comprising reduction gearing 16 through which the speed of a motor-driven shaft 17 is reduced and delivered to the input shaft 18 of a primary transmission forming the second section of the drive. This transmission may be extremely simple in nature and is at present shown as comprising a single slidable triple gear unit 19 the gear elements of which coact with fixed gears upon a shaft 20 which shaft 20 comprises the input shaft of the main transmission forming the third section of the drive.

The shaft 20 has rotatably mounted thereon a splined sleeve 21 upon which are slidably mounted a pair of gears 22 and 23. The sleeve 21 has its hub formed with one element 24 of a clutch which confronts a collar 25 splined upon the shaft 20 and having one end thereof formed with the second element 26 of the last-named clutch and its opposite end provided with a gear 27. The main transmission comprises a second shaft 28 having rotatably mounted thereon and suitably held against longitudinal movement with relation thereto a hub 29 bearing a gear 30 for co-action with gear 27 and a gear 31 for coaction with sliding gear 22 of sleeve 21. Gears 30 and 31 are fixed to hub 29, and the inner end of this hub is formed as one element 32. The second element of this clutch is in the form of a collar 33 splined upon shaft 28. Shaft 28 additionally bears a fixed gear 34 which is adapted for coaction with gear 23 and has further fixed thereto a pinion 35 in constant mesh with slow speed gear 11. High speed gear 15 is adapted for coaction with the gear 30 of hub 29. It will be obvious that with an arrangement of this character it will be possible to obtain seven speed changes in the main transmission alone, and with the present illustration each of these speed changes may have three variations determined by the primary transmission. The various speed changes possible are semidiagrammatically illustrated in Figures 2 to 8.

Figure 2:
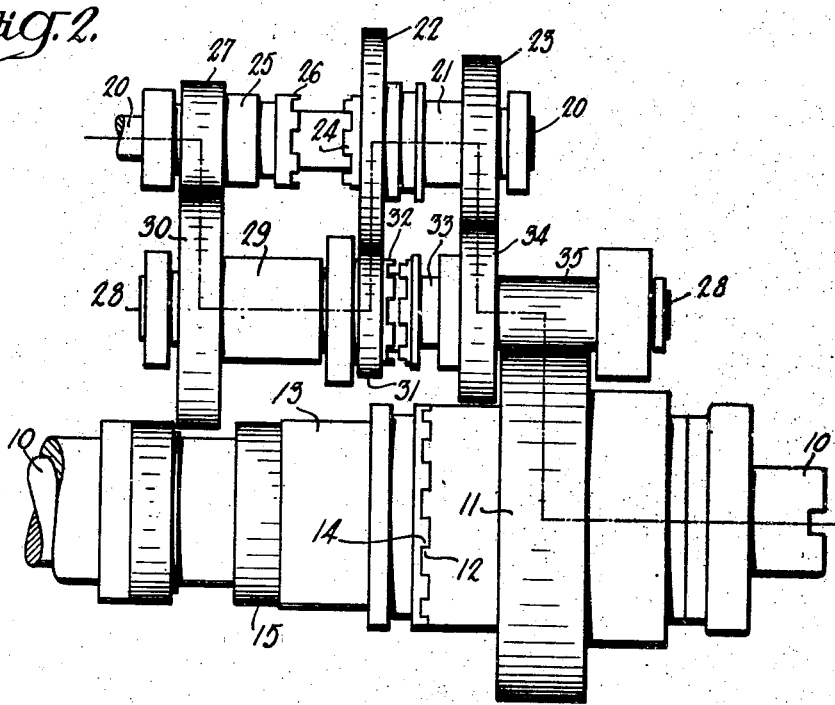
Figure 3:
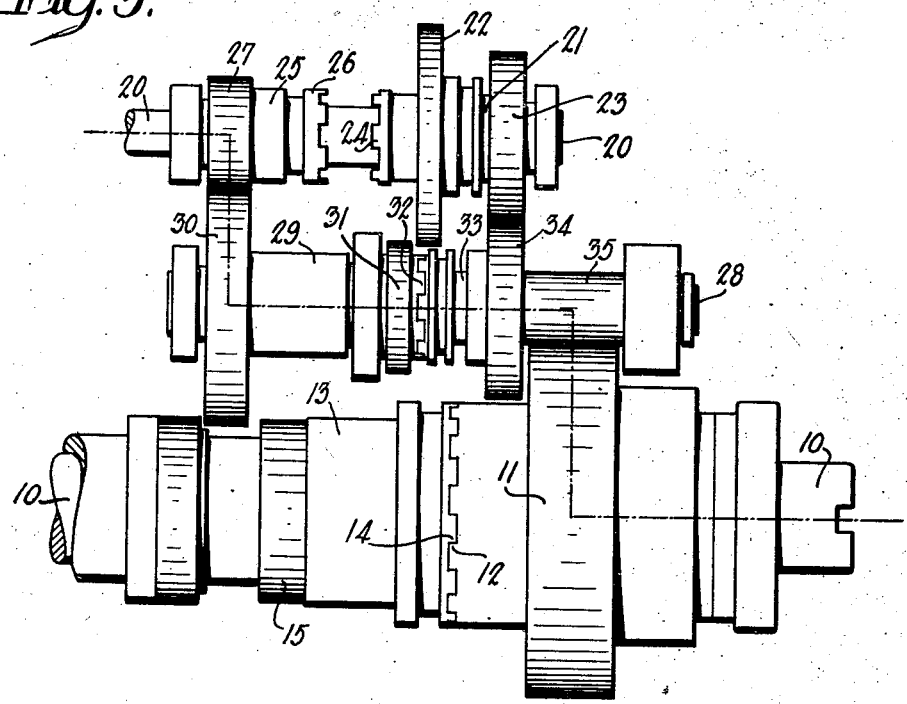
Figure 4:
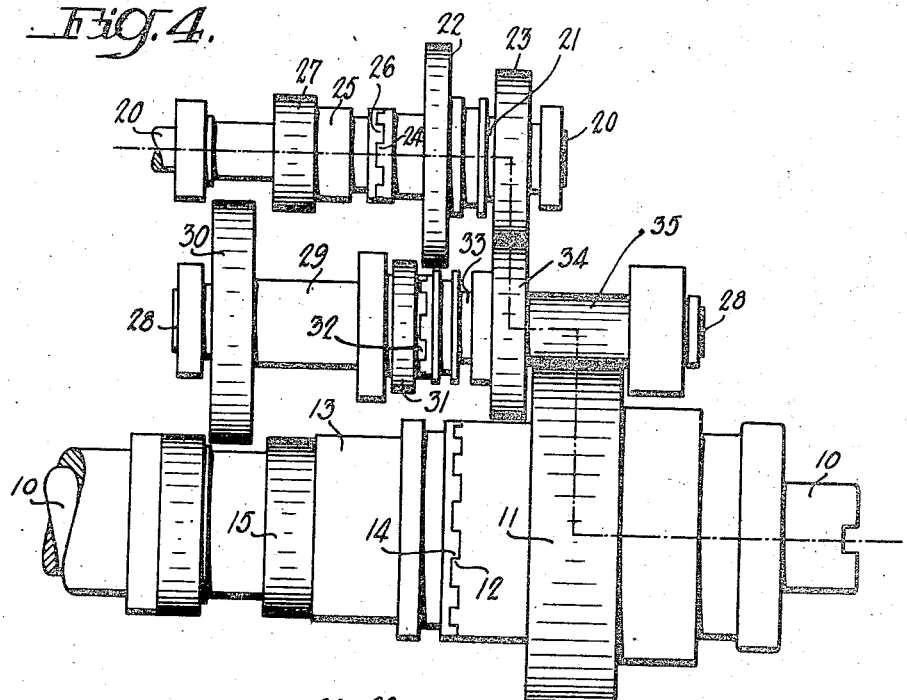
Figure 5:
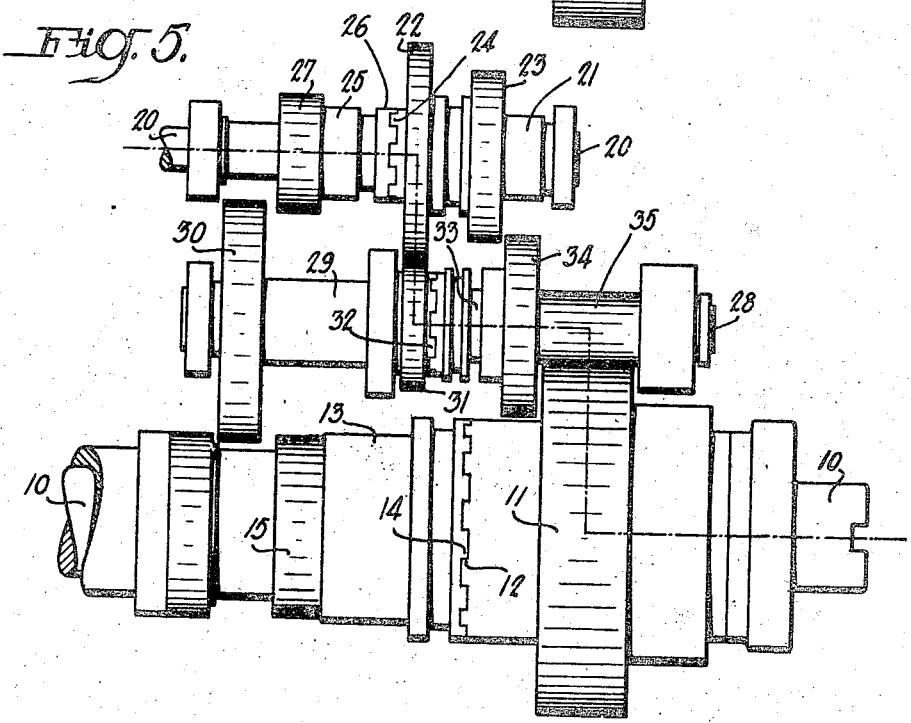

In Figure 2 the slow speed setting is illustrated. In this figure, gear 27 is engaged with gear 30 of hub 29 and the gears 22 and 23 of sleeve 21 are engaged with the gear 31 of hub 29 and the gear 34 respectively. Hub 29 is declutched from shaft 28 and slow speed gear 11 is clutched to the spindle. Since sleeve 21 is declutched from shaft 20 whenever gears 27 and 30 are in engagement with one another, the gearing 31, 22 and 23, 34 merely act as back gearing reducing the rate of drive to the spindle. By simply disengaging the gears 22 and 31 and clutching hub 29 to shaft 28 as in Figure 3, a slightly higher speed at the spindle is obtained. As a further step, the speed may be again increased by sliding collar 25 to the right, thereby disengaging gears 27 and 30 and clutching the sleeve 21 to shaft 20, as shown in Figure 4. A still further increase in speed may now be obtained by sliding both gears 22 and 23 of sleeve 21 to the left, thereby disengaging gears 23 and 34 and engaging gears 22 and 31 as in Figure 5. These constitute the slow speed changes in the main transmission all of which, as hereinbefore noted, are capable of modification by shifts in the primary transmission.

Figure 6:
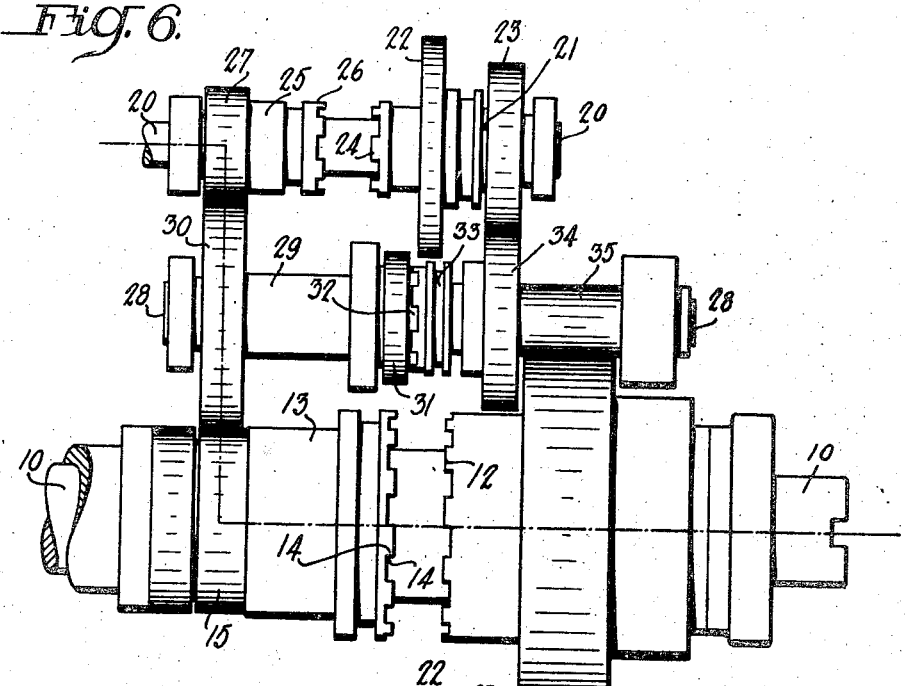
Figure 7:
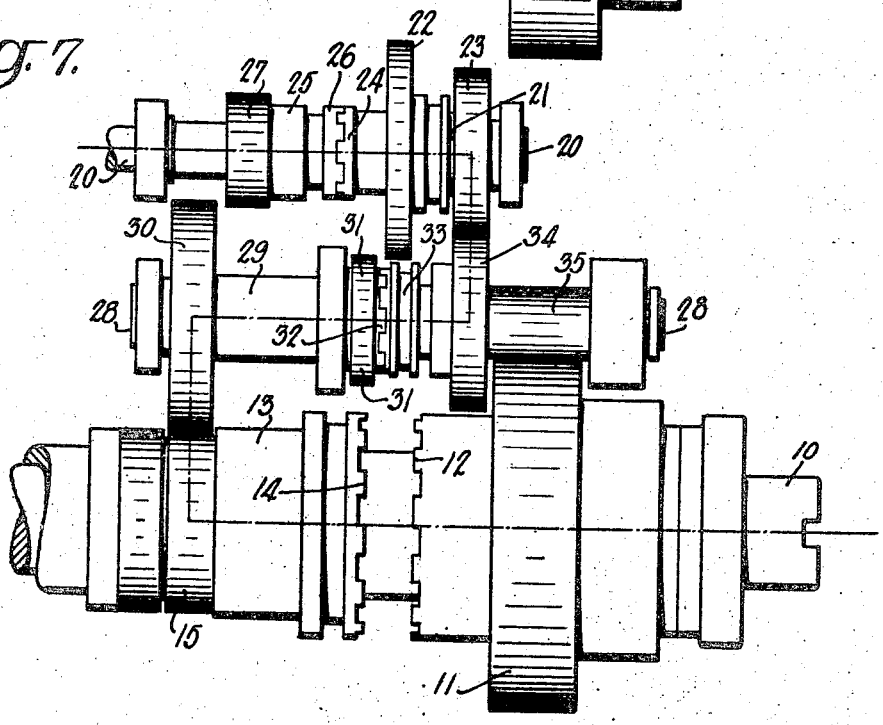
Figure 8:
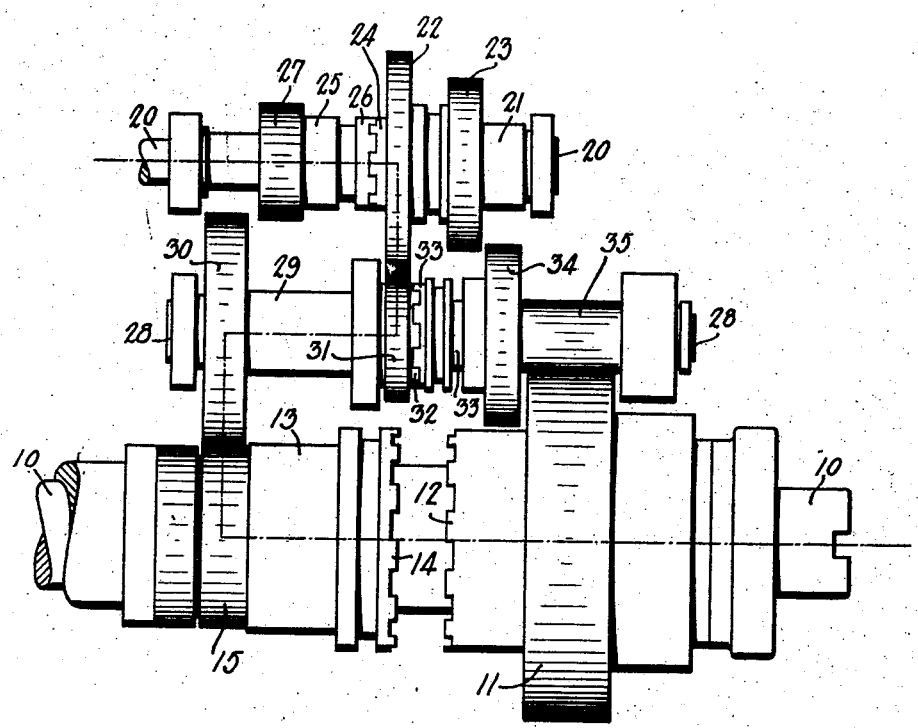

The high speed settings are shown in Figures 6 to 8. In Figure 6 the spindle is connected to the input shaft through the gear 30 of hub 29 and high speed gear 15. At this time the hub 29 may be either connected to shaft 28 or disengaged therefrom, as desired. An increased high speed is obtained by shifting collar 25 to disengage gears 27 and 30 and clutch the sleeve 21 to the shaft 20, gears 23 and 34 being engaged, gears 22 and 31 being disengaged, and the hub 29 being clutched to shaft 28 as in Figure 7. By now sliding both gears 22 and 23 to the left, as in Figure 8, a still further increase in speed is obtained through engagement of gears 22 and 31.

It will thus be seen that with the arrangement illustrated, twenty-one separate speeds of the spindle may be obtained, and this with the use of transmission elements including only fifteen gears and six sliding gears and/or clutches. Obviously, such a construction materially reduces the cost and complication of the transmission and lessens liability to deterioration. Not only is the number of gears materially reduced, but a very high range of speeds is obtained with the use of only four centers which will again enable a reduction in the cost of production.

Since the construction is capable of considerable modification without departing from the spirit of my invention, I do not wish to be understood as limiting myself thereto except as hereinafter claimed.

I claim:

1. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby, means to selectively connect the sleeve to the hub or to said second shaft to drive the same, and means to selectively connect the first shaft to said hub or to said sleeve to drive the same.

2. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby comprising a pinion on said second shaft, a gear rotatable about the spindle, a gear on said hub and a collar splined to the spindle, said collar including a clutch element for clutching the rotatable gear to the spindle and a gear engageable with the gear of the hub, means to selectively connect the sleeve to the hub or to said second shaft to drive the same, and means to selectively connect the first shaft to said hub or to said sleeve to drive the same.

3. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby, means to selectively connect the sleeve to the hub or to said second shaft to drive the same comprising a gear fixed to said hub, a gear fixed to said second shaft, and a pair of gears splined to said sleeve, said splined gears being mated with said gear of said hub and said gear of the second shaft and being independently movable into engagement with the associated gears of said hub and second shaft, and means to selectively connect the first shaft to said hub or to said sleeve to drive the same.

4. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby, means to selectively connect the sleeve to the hub or to said second shaft to drive the same, and means to selectively connect the first shaft to said hub or to said sleeve to drive the same comprising a gear fixed to said hub and a clutch gear splined to said first shaft and alternately effective to engage the gear of said hub and clutch said sleeve to the first shaft.

5. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby comprising a pinion on said second shaft, a gear rotatable about the spindle, a gear on said hub and a collar splined to the spindle, said collar including a clutch element for clutching the rotatable gear to the spindle and a gear engageable with the gear of the hub, means to selectively connect the sleeve to the hub or to said second shaft to drive the same comprising a gear fixed to said hub, a gear fixed to said second shaft, and a pair of gears splined to said sleeve, said splined gears being mated with said gear of said hub and said gear of the second shaft and being independently movable into engagement with the associated gears of said hub and second shaft, and means to selectively connect the first shaft to said hub or to said sleeve to drive the same.

6. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby comprising a pinion on said second shaft, a gear rotatable about the spindle, a gear on said hub and a collar splined to the spindle, said collar including a clutch element for clutching the rotatable gear to the spindle and a gear engageable with the gear of the hub, means to selectively connect the sleeve to the hub or to said second shaft to drive the same, and means to selectively connect the first shaft to said hub or to said sleeve to drive the same comprising a gear fixed to said hub and a clutch gear splined to said first shaft and alternately effective to engage the gear of said hub and clutch said sleeve to the first shaft.

7. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby, means to selectively connect the sleeve to the hub or to said second shaft to drive the same comprising a gear fixed to said hub, a gear fixed to said second shaft, and a pair of gears splined to said sleeve, said splined gears being mated with said gear of said hub and said gear of the second shaft and being independently movable into engagement with the associated gears of said hub and second shaft, and means to selectively connect the first shaft to said hub or to said sleeve to drive the same comprising a gear fixed to said hub and a clutch gear splined to said first shaft and alternately effective to engage the gear of said hub and clutch said sleeve to the first shaft.

8. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby comprising a pinion on said second shaft, a gear rotatable about the spindle, a gear on said hub and a collar splined to the spindle, said collar including a clutch element for clutching the rotatable gear to the spindle and a gear engageable with the gear of the hub, means to selectively connect the sleeve to the hub or to said second shaft to drive the same comprising a gear fixed to said hub, a gear fixed to said second shaft, and a pair of gears splined to said sleeve, said splined gears being mated with said gear of said hub and said gear of the second shaft and being independently movable into engagement with the associated gears of said hub and second shaft, and means to selectively connect the first shaft to said hub or to said sleeve to drive the same comprising a gear fixed to said hub and a clutch gear splined to said first shaft and alternately effective to engage the gear of said hub and clutch said sleeve to the first shaft.

9. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby, means to selectively connect the sleeve to the hub or to said second shaft to drive the same comprising a gear fixed to said hub, a gear fixed to said second shaft, and a pair of gears splined to said sleeve, said splined gears being mated with said gear of said hub and said gear of the second shaft and being independently movable into engagement with the associated gears of said hub and second shaft, and means to selectively connect the first shaft to said hub or to said sleeve to drive the same comprising a gear fixed to said hub and a clutch gear splined to said first shaft and alternately effective to engage the gear of said hub and clutch said sleeve to the first shaft.

10. In a spindle drive of the type described, a spindle, a first shaft, a sleeve rotatable thereon, a second shaft, a hub rotatable thereon, means to clutch said hub to said second shaft, means to selectively connect said spindle to said hub or said second shaft to be driven thereby comprising a pinion on said second shaft, a gear rotatable about the spindle, a gear on said hub and a collar splined to the spindle, said collar including a clutch element for clutching the rotatable gear to the spindle and a gear engageable with the gear of the hub, means to selectively connect the sleeve to the hub or to said second shaft to drive the same comprising a gear fixed to said hub, a gear fixed to said second shaft, and a pair of gears splined to said sleeve, said splined gears being mated with said gear of said hub and said gear of the second shaft and being independently movable into engagement with the associated gears of said hub and second shaft, and means to selectively connect the first shaft to said hub or to said sleeve to drive the same comprising a gear fixed to said hub and a clutch gear splined to said first shaft and alternately effective to engage the gear of said hub and clutch said sleeve to the first shaft.

CHARLES L. GROVER.